(No Model.) 4 Sheets—Sheet 1.

J. H. W. STRINGFELLOW.
PROCESS OF MANUFACTURING GAS.

No. 467,266. Patented Jan. 19, 1892.

Witnesses:
D. H. Maynord
George Barry.

Inventor:
John Henry Williams Stringfellow
by attorneys
Brown & Seward (No Model.) 4 Sheets—Sheet 2.

J. H. W. STRINGFELLOW.
PROCESS OF MANUFACTURING GAS.

No. 467,266. Patented Jan. 19, 1892.

Witnesses:—
George Barry
D. H. Hayford

Inventor:
John Henry Williams Stringfellow
by attorneys
Brown & Seward

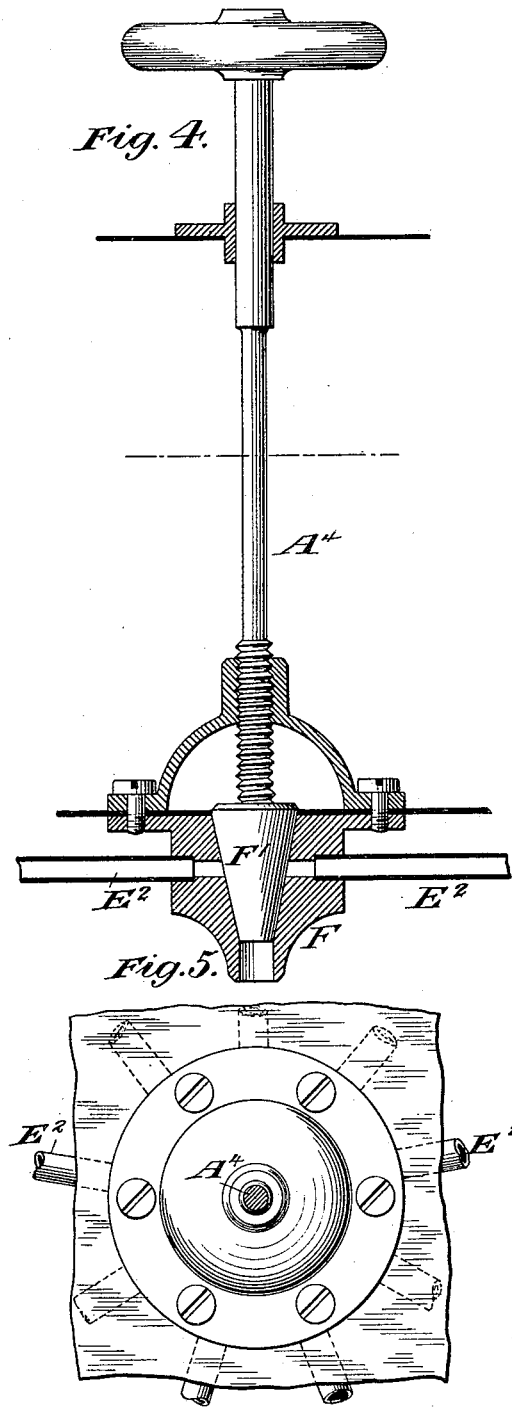

(No Model.)   4 Sheets—Sheet 4.

J. H. W. STRINGFELLOW.
PROCESS OF MANUFACTURING GAS.

No. 467,266.   Patented Jan. 19, 1892.

Witnesses:-
George Barry.
O. E. Sundgren.

Inventor:
John Henry Williams Stringfellow
by attorneys
Brown & Seward

UNITED STATES PATENT OFFICE.

JOHN HENRY WILLIAMS STRINGFELLOW, OF LONDON, ENGLAND.

PROCESS OF MANUFACTURING GAS.

SPECIFICATION forming part of Letters Patent No. 467,266, dated January 19, 1892.

Original application filed February 27, 1891, Serial No. 378,620. Divided and this application filed June 10, 1891. Serial No. 395,763. (No model.) Patented in England April 29, 1890, No. 6,575; in France February 6, 1891, No. 211,218, and in Belgium March 14, 1891, No. 94,138.

*To all whom it may concern:*

Be it known that I, JOHN HENRY WILLIAMS STRINGFELLOW, of 29 to 33 Wormwood Street, in the city of London, England, have invented certain new and useful Improvements in Processes of Manufacturing Gas, (for which I have obtained patents in England, by Patent No. 6,575, dated April 29, 1890; in Belgium, by Brevet d'Invention No. 94,138, dated March 14, 1891, and in France February 6, 1891, No. 211,218,) of which the following is a specification.

The object of this invention is to make gas in a simple and economical manner suitable for various purposes in the arts.

Figure 1:
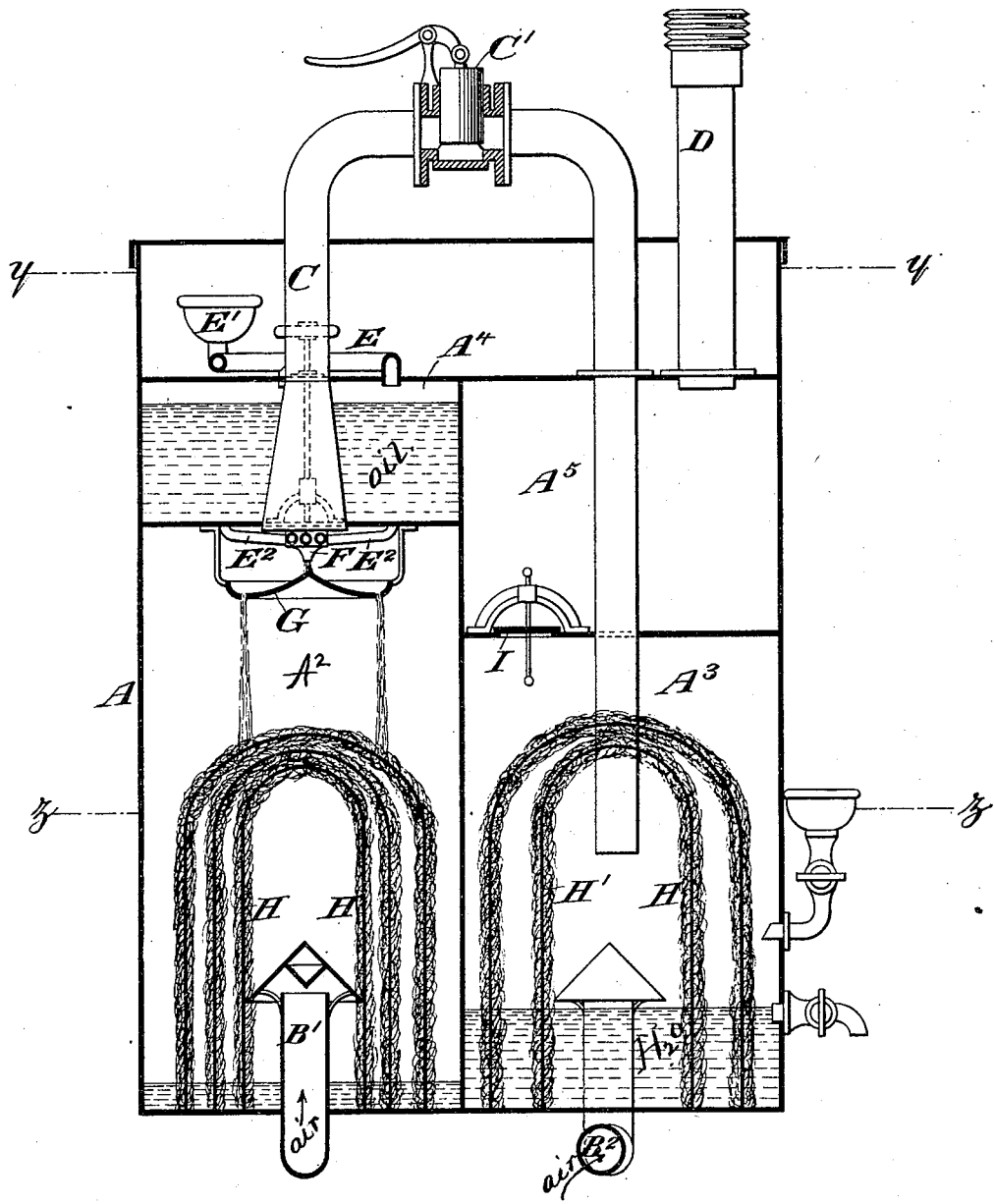
Figure 2:
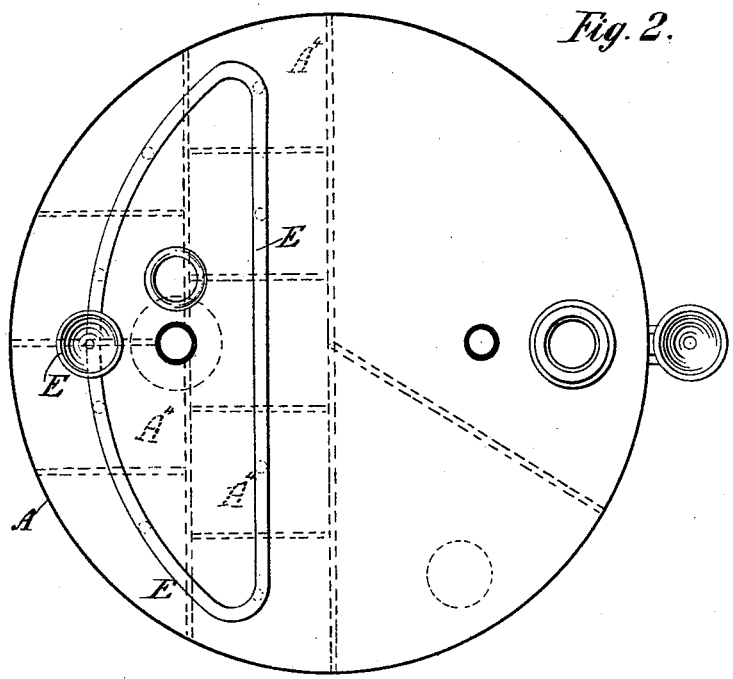
Figure 3:
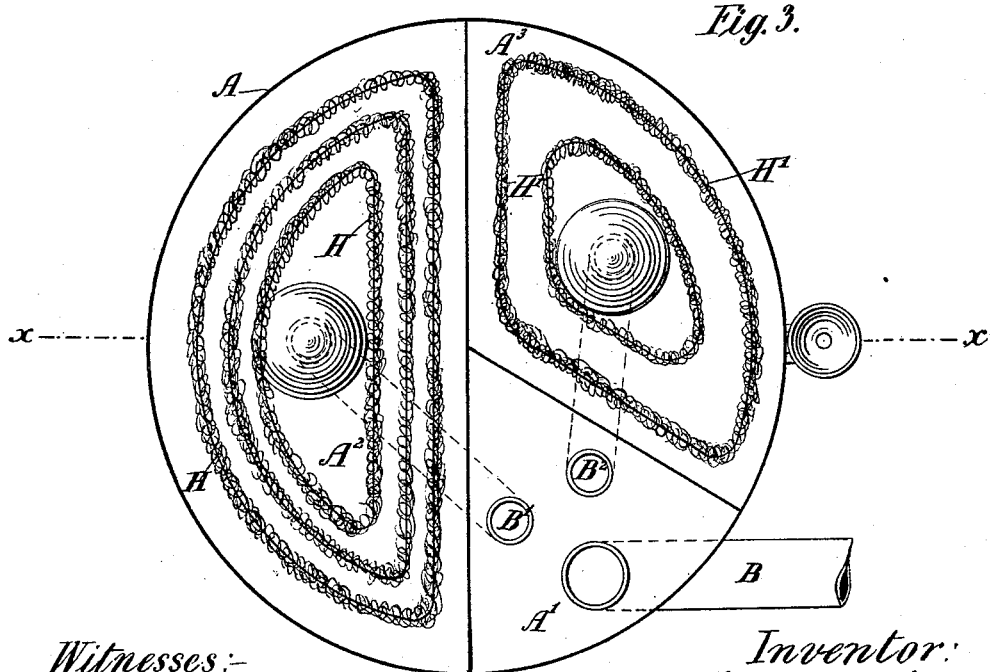
Figure 6:
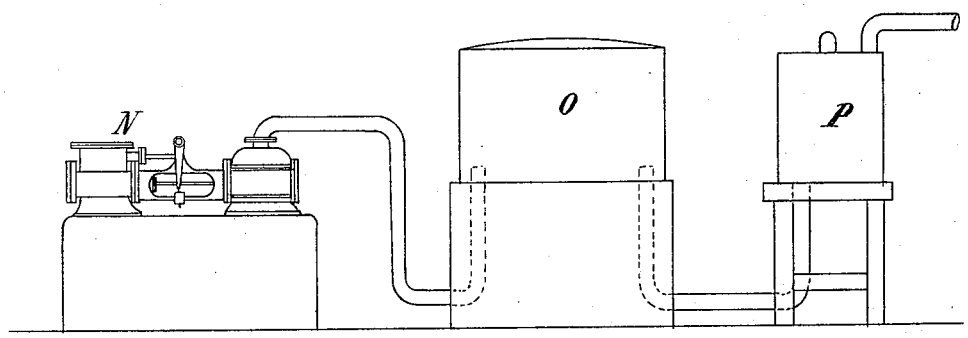

In the accompanying drawings, Figure 1 shows a vertical section of the apparatuses which I employ for the purposes of my invention, taken in the line $x$ $x$ of Fig. 3. Fig. 2 is a horizontal section on the line $y$ $y$ of Fig. 1. Fig. 3 is a similar section on the line $z$ $z$ of Fig. 1. Fig. 4 is a vertical section, and Fig. 5 a plan view, partly in section, of a valve for controlling the supply of liquid hydrocarbon; and Fig. 6 is a diagram in elevation showing an arrangement of plant for producing gas.

The process for making gas consists in charging atmospheric air undersaturated with hydrocarbon with the vapor of water at its normal temperature, whereby a gas is produced which is permanent or sufficiently permanent for practical purposes, has great heating power, and is capable of being used for many purposes in the arts—such, for example, as general heating, incandescent lighting, and for glass and forging furnaces.

In carrying out my invention I may employ the apparatus shown in the accompanying drawings, which consists of a vessel A, of suitable shape, divided up internally into three chambers (see Fig. 3)—namely, an air-receiving chamber A', a hydrocarbon-chamber $A^2$, and a water-chamber $A^3$. The chamber $A^2$ contains a liquid-hydrocarbon reservoir $A^4$, which may be formed by dividing off the upper portion by means of a horizontal partition, and the chamber $A^3$ is also subdivided by a partition to form the gas-chamber $A^5$. The air-chamber A' is connected with a pump or blower or with the atmosphere by a pipe B, and also with the hydrocarbon and the water chambers $A^2$ $A^3$ by pipes B' and $B^2$, respectively, which may be provided with regulating-valves of suitable construction.

C is a pipe which connects the chamber $A^2$ with the chamber $A^3$, a valve C', of convenient construction, being provided to regulate the flow of carbureted air to the water-chamber.

D is an outlet-pipe for the gas from the gas-chamber $A^5$ to the holder or elsewhere for use.

The reservoir $A^4$ may be subdivided into several compartments, as indicated by dotted lines in Fig. 2, each compartment being supplied from above by a perforated distributing-pipe E, provided with a funnel or receiving-cup E'.

For delivery purposes each compartment has a pipe $E^2$, which pipes converge to the receiving-chamber or barrel F of a screw-down plug-valve F'. (See Figs. 4 and 5.) From this valve the fluid flows in regulated quantities onto the perforated distributing-dish G, from which it passes to the chamber $A^2$.

H H' are sets of screens or frame-works covered with some absorbent material forming domes, which I term "vaporizers." These sets of vaporizers H H', which may consist of two, three, or more screens, are placed in the chambers $A^2$ and $A^3$, respectively, and over the respective inlet-pipe B' $B^2$ of each chamber. The hydrocarbon liquid flows from the dish G in fine streams, drops onto the outer of the set of three vaporizers H, down which (when completely saturated) it runs, and collects at the bottom, and then by capillary attraction saturates the other two vaporizers. The set of two vaporizers H' in the water-chamber $A^3$ is saturated from below by capillary attraction.

I may here remark that the mode of conveying the liquids to the absorbent material may be reversed or either mode may be used in both compartments.

The pipe C for conveying the carbureted air from $A^2$ to $A^3$ will be arranged to pass through the screens H', so that the said carbureted air will be introduced below the screens and then be forced to pass through them to take up the waste vapor.

When making gas according to this invention, I proceed as follows: Atmospheric air is caused to enter, by pressure or exhaust, by the pipe B into the chamber A', from which it passes by the pipe B' to the chamber A² beneath the vaporizers H. It is then caused to pass through the absorbent porous material, taking up a proportion of hydrocarbon vapor, and enters the pipe C, by which it is conveyed under the water-vaporizers H' in the chamber A³ to be further treated. The carbureted air is then caused to pass through the water-vaporizers H', taking up a proportion of water-vapor, by which it is converted into a gas, which is permanent or sufficiently so for practical purposes and of high heating power. In place of carbureted air, as above described, to be passed through the water-vaporizers I may utilize natural or other gas, in which air combined with a hydrocarbon is found, and pass it through the apparatus with or without additional carbureting in chamber A². From the chamber A³ the gas passes through the valve I into the collecting-chamber A⁵, and thence by way of the pipe D to the holder or otherwise for use. Where the air is to be charged with the hydrocarbon, it is intended that in passing through the carbureting-chamber it shall be allowed to take up such an amount of hydrocarbon as will undersaturate it only. If it be found too rich in hydrocarbon when it is brought into intimate contact with the vapor of water, or if, as stated above, a gas—such, for example, as natural gas—be employed which is too highly saturated with hydrocarbon, the proper relative proportions of air and hydrocarbon required in the gas for obtaining the highest and most satisfactory results may be obtained by introducing an additional or supplementary supply of air into the mixture, which additional air ought also to be passed through water in such form that aqueous vapor is readily taken up therefrom, and therefore this supplementary supply of air may be led directly into the water-chamber, if desired. I therefore allow a portion of the air to pass direct by the pipe B² to the chamber A³ below the vaporizers H', where it mixes with the rich carbureted air and dilutes it before passing through the water-vaporizers to be converted into a gas. The pipe B² is provided with well-known and suitable means for controlling the supply of air therefrom.

It will be evident that suitable filling-funnels and overflow and other taps, &c., will be provided to fill up with and regulate the height of both water and hydrocarbon.

When pressure is employed to produce the gas, the plant shown in Fig. 6 will preferably be employed, N being the pump, O an equalizer of the nature of a small gas-holder to equalize the pressure, and P the gas-making apparatus.

The essential feature of my invention is the combining of atmospheric air with hydrocarbon vapor and vapor of water in such proportions that the resulting finished gas will be practically a combination of air undersaturated with hydrocarbon and a very considerable percentage of the vapor of water taken up directly from water itself as distinguished from steam.

By this process I find that I obtain a non-illuminating heating or fuel gas which is permanent or sufficiently so for practical purposes and which burns with perfect combustion and produces an intense heat, whereby it is rendered suitable for incandescent lighting, smelting and other heating furnaces, and for general heating purposes.

In the preceding description I have used the phrase "normal temperature" several times in connection with the vapor of water. In the use of this phrase I wish to be understood as intending to distinguish the ordinary vapor of water from steam—that is, I intend to distinguish water taken up by the passage of a gaseous fluid through water suitably provided for this operation from steam, which is produced by independent artificial heating of the water to a temperature which shall be sufficient to change it from its normal condition to its abnormal or steam condition.

The test which I apply to determine the relative proportions of hydrocarbon air and watery vapor consists, practically, in leading the mixture to a burner and there igniting it. If the flame burns yellow, the supply of air is increased until the flame becomes substantially non-luminous and almost or quite invisible.

By a careful analysis the relative amount of watery vapor to hydrocarbon vapor ranges from one to fifteen to one to ten. The proportions will, however, necessarily change according to the difference of temperature and materials, the proportions suggested above being given as producing satisfactory results.

The apparatus which I have herein shown and described in connection with my process forms the subject-matter of a separate pending application, Serial No. 378,620, filed February 27, 1891, and hence no claim therefor is made herein, the present application being a division of said first-named application.

Having now particularly described and ascertained the nature of the said invention and in what manner the same is to be performed, I declare that what I claim is—

1. The process of making a gas for heating, consisting in charging atmospheric air undersaturated with hydrocarbon, as described, with a vapor of water at its normal temperature, substantially as set forth.

2. The process of making a gas for heating, consisting in first combining with atmospheric air an amount of hydrocarbon vapor sufficient to only undersaturate it, as described, and subsequently charging the so undersaturated air with vapor of water at the normal temperature, substantially as set forth.

3. In a process for making a heating or fuel gas which consists of atmospheric air, hydrocarbon, and the vapor of water, the herein-described method of regulating the relative proportions of air, hydrocarbon, and water therein by introducing a supplementary supply of air directly into the water-chamber, substantially as described.

JOHN HENRY WILLIAMS STRINGFELLOW.

Witnesses:
H. K. WHITE,
A. V. BISHOP.